United States Patent [19]

Bauer et al.

[11] Patent Number: 5,372,449
[45] Date of Patent: Dec. 13, 1994

[54] WIPER SYSTEM FOR MOTOR VEHICLES

[76] Inventors: Kurt Bauer, Wolfsgrubenstr. 21, 7121 Ingersheim 2; Eckhardt Schmid, Heilbronner Str. 62, 7129 Brackenheim, both of Germany

[21] Appl. No.: 836,298
[22] PCT Filed: Jul. 4, 1991
[86] PCT No.: PCT/EP91/01247
  § 371 Date: Apr. 3, 1992
  § 102(e) Date: Apr. 3, 1992
[87] PCT Pub. No.: WO92/00865
  PCT Pub. Date: Jan. 23, 1992

[30] Foreign Application Priority Data

Jul. 9, 1990 [DE] Germany ............... 4021845
  Jul. 20, 1990 [DE] Germany ............... 4023045

[51] Int. Cl.5 ............... B60S 1/00; F16B 4/00
[52] U.S. Cl. ............... 403/273; 403/282; 403/274; 403/23; 29/515
[58] Field of Search ............... 403/274, 273, 282, 23, 403/284, 279, 242; 29/515, 516, 517, 447; 15/250.31–250.35, 250.42

[56] References Cited

U.S. PATENT DOCUMENTS

| 2,487,512 | 11/1949 | Berger | 29/516 |
| 3,425,719 | 2/1969 | Burton | 29/516 |
| 3,811,367 | 5/1974 | Bimba | 403/23 |
| 3,848,325 | 11/1974 | Bimba | 29/516 |
| 4,624,879 | 11/1986 | Van Dijck | 403/273 |
| 4,693,501 | 9/1987 | Logsdon, Jr. et al. | |

FOREIGN PATENT DOCUMENTS 2920899 1/1981 Germany .
2218622 11/1989 United Kingdom .

Primary Examiner—Randolph A. Reese
Assistant Examiner—Anthony Knight
Attorney, Agent, or Firm—Robert P. Seitter; J. Gordon Lewis

[57] ABSTRACT

A wiper system for motor vehicles is described, which wiper system includes at least one wiper bearing as well as one drive member cooperating with a motor, which drive member is operatively connectable to the wiper bearing via a carrier. At least the connecting section between the wiper bearing as well as the carrier and/or the drive member is provided with a medium impermeable coating.

11 Claims, 3 Drawing Sheets

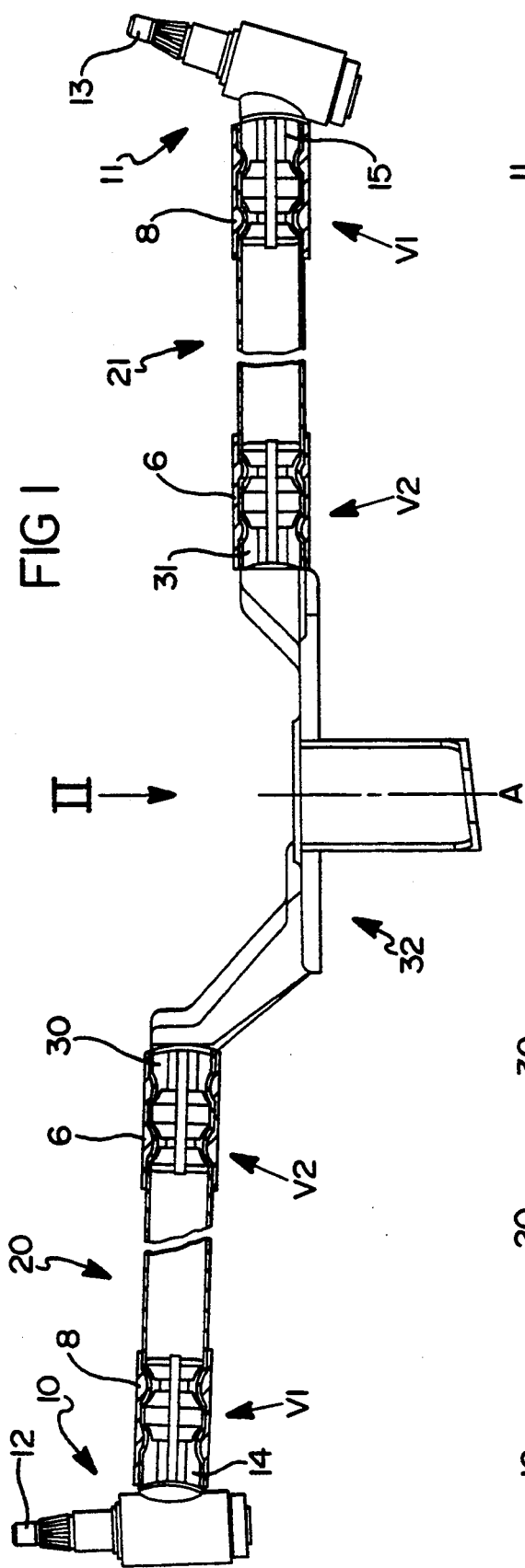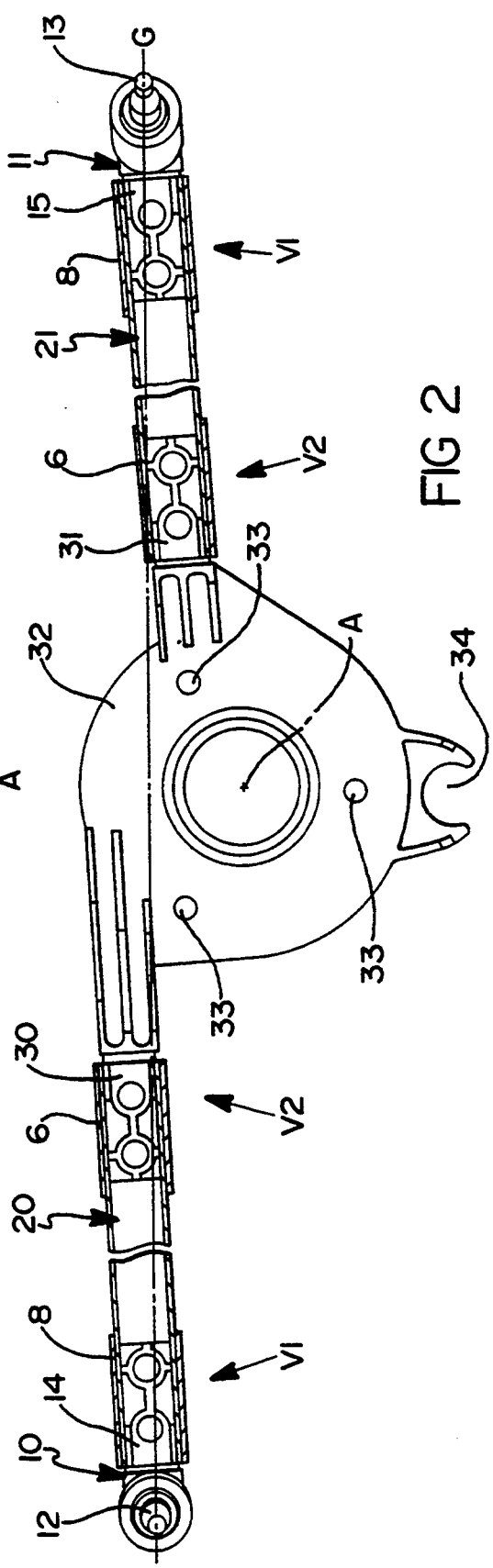

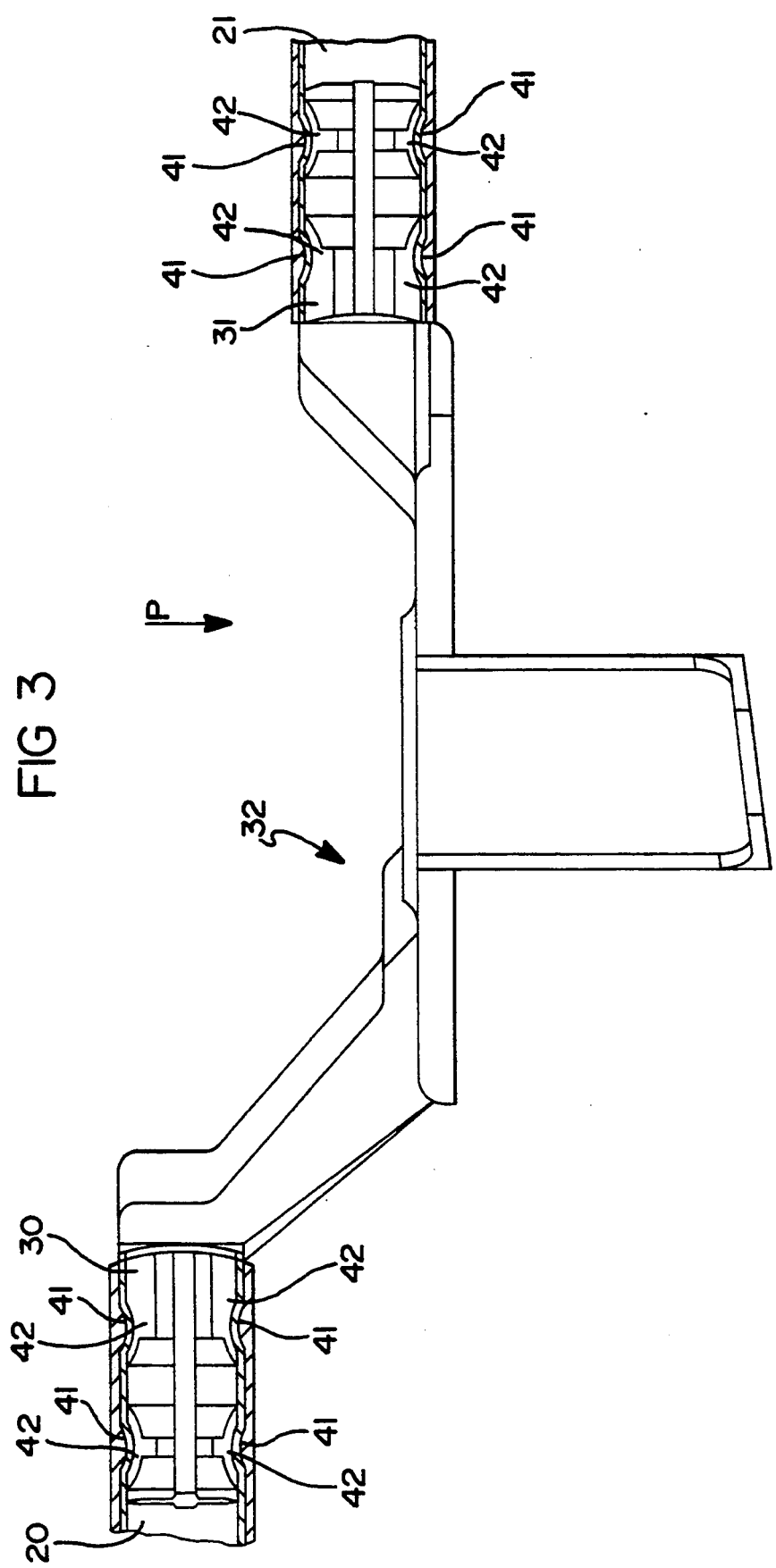

WIPER SYSTEM FOR MOTOR VEHICLES

INTRODUCTION

The present invention relates to a wiper system for motor vehicles comprising at least one wiper bearing and/or one motor carrier member which according to its operational function is connectable to the one end of a pipe-like carrier.

BACKGROUND OF THE INVENTION

Wiper systems of the kind mentioned above normally consist of several pre-formed members provided with coloured varnish, which members are operatively linked to each other. Thereby the members firmly connectable to each other during operation can be soldered, screwed or connected by crimping. The latter way of connection is used in wiper systems especially often and advantageously because thus the desired connections can be realized particularly quickly, securely and at low costs. However, a disadvantage is that the connecting areas, when being crimped, are confronted with forces which may damage the varnish so that the protection against corrosion of the varnish is lost.

BRIEF DESCRIPTION OF THE INVENTION

Presupposing the prior art mentioned above, the object of the invention is to develop the wiper system without inappropriate constructive effort in such a way that sufficient protection against corrosion of the connecting areas is given even then, when these connecting areas are produced by deforming the carrier.

The object is achieved according to the invention by providing at least the connecting section between the wiper bearing as yell as the carrier and/or the carrier as well as the motor carrier member with a medium impermeable coating.

It can be seen that the invention is realized in any case then, when certain connecting sections of the wiper system which are formed by deforming at least the carrier, are provided with protection against corrosion taking over the function of the varnish. Of course, covering the connecting sections is also of an advantage in case of carriers that are only galvanized or protected otherwise without varnish because, when deforming the carrier, the protecting surface layer is damaged.

Therefore the invention also takes into consideration that the connecting area, the varnish of which has been damaged, is provided with new varnish.

Further useful and advantageous embodiments of the invention can be gathered from the subclaims.

In case of a wiper system with a pipe-like carrier which is connectable to a stud of the wiper bearing and/or of the motor carrier member, it is useful, if the coating consists of a plastic skin which can form- and force-fittingly be connected to the connecting section. It is of an advantage that the coating extends the end of the carrier and thus prevents water, oil, dust etc. from penetrating between the stud and the carrier. Then the connection is also protected from the inside.

In order to produce an operative connection between the studs and the carrier, another useful embodiment of the invention provides that the studs comprise recesses, for example cuts or notches, and that the carrier can be connected via the studs in the area of the recesses by crimping, that is by pressing the carrier into the recesses of the stud. Within this inventive idea it is of a special advantage, if the studs comprise at least two recesses each. Of course, such connections are not only restricted to wiper systems. The important idea of this embodiment of the invention can be used with respect to all these connections, in which quick and secure connections are to be realized by deforming at least one member.

Another useful embodiment shows that the studs are connectable with the carrier by plug-in connections.

The stability and the operative connection between the different members of such a wiper system can further be improved by the fact that the carrier as well as the studs are of an approximately round cross-section, whereby the inner diameter of the carrier is slightly bigger than the outer diameter of the respective stud.

It has been of a special advantage, if the coating consists of a heat shrinkable plastic tube. By taking these measures not only the connecting section, but also the ends of the carrier are covered gasproof so that no air and other media can reach the areas between the carrier and the stud. For this purpose a tube made of polymeric material resistant to tearing is especially appropriate. The better the quality of the heat shrinkable plastic tube the smaller the thickness of the wall may be so that the optical impression or the optical change given to the carrier due to the heat shrinkable plastic tube is at a minimum, especially then, when the colours of the heat shrinkable plastic tube approximately correspond to the varnish of the carrier.

If the length of the heat shrinkable plastic tube is chosen with respect to the length of the carrier according to the claims the heat shrinkable plastic tube can freely be moved at first on the carrier before shrinking to such an extent that the respective connecting section is free for deforming the carrier.

The invention also relates to a method of producing a medium impermeable coating in wiper systems according to one of the measures mentioned above. Thereby it is proceeded in such a way that the carrier is provided with at least one pre-formed heat shrinkable plastic tube and is operatively connected with the studs. Then the heat shrinkable plastic tube is warmed up to a temperature in which the shrinking process of the tube is released. Since normally the operational temperature of the wiper system is highly below the temperature in which great deformations of the heat shrinkable plastic tube are caused due to the heat, a gasproof connection between the heat shrinkable plastic tube and the connecting area is secured.

BRIEF DESCRIPTION OF THE DRAWINGS

The invention and advantageous developments thereof are described by means of the embodiments illustrated in the drawings, in which FIG. 1 is a lateral view of a carrier frame of a wiper system;

FIG. 2 is a view in the direction of arrow according to FIG. 1;

FIG. 3 is a lateral view of the motor carrier member, on an enlarged scale;

Figure 4:
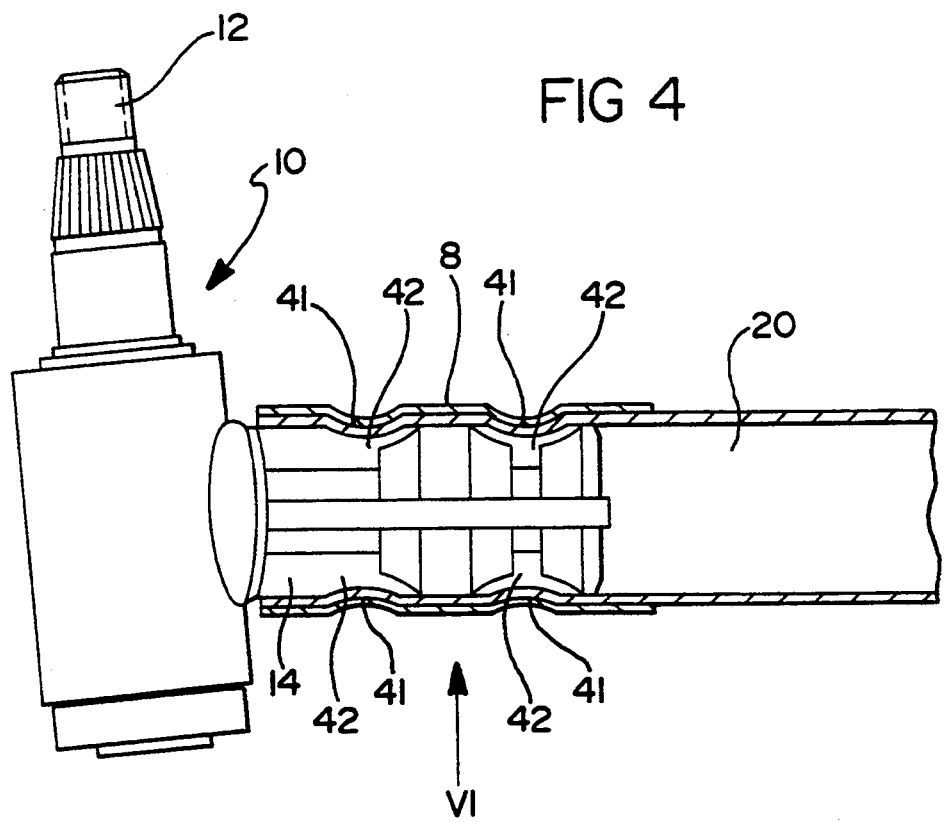
FIG. 4 is a section of a pipe-like carrier with a wiper bearing, on an enlarged scale.

DETAILED DESCRIPTION OF THE PREFERRED AND ALTERNATIVE EMBODIMENTS OF THE INVENTION

In the FIGS. 1 to 4 members of a wiper system for motor vehicles with two wiper bearings 10, 11 as well as a motor carrier member 32 carrying a motor not illustrated, which motor carrier member 32 can operatively be connected to the wiper bearings 10, 11 via carriers 20, 21 are shown. In the wiper bearings 10 and 11 wiper shafts 12 and 13, respectively, are rotatably mounted via bearing bushes in a known manner. These wiper bearings are made of zinc diecasting and integrally have a stud 14, 15 each. The wiper system comprises pipe-like carriers 20, 21 of a preferably round cross-section. Studs 14, 15 each of the wiper bearing 10, 11 is inserted into the one end of this pipe-like carrier 20, 21. Studs 30, 31 of motor carrier member 32 are inserted into the other end of this pipe-like carrier 20, 21. Therefore the carrier frame of the wiper system consists of two pipe-like carriers 20, 21 and the motor carrier member 32 which as a diecasting member is made of aluminum or zinc. The pipe-like carriers are arranged on the studs of the wiper bearing or the motor carrier member stable in form. The FIGS. 1 and 2 show that the pipe-like carriers 20, 21 are situated on different levels, whereby the necessary displacement by means of the respectively formed motor carrier member 32 can be realized without difficulties.

In FIG. 2 fixing holes are designated by 33, onto which the actual drive motor of the wiper system is fixed by screwing. The drive axis of the drive motor extends along the line A. In FIG. 2 a straight line G connecting the two wiper bearings 10, 11 to each other is indicated. It can be seen that the distance between the drive axis A of this motor and this straight line G connecting the wiper bearings 10, 11 to each other is relatively small so that no big phase shift between the wiping movements of the two wipers can be stated. This is achieved by the arrangement of the studs 30, 31 that can be seen in FIG. 2. In this context it is of importance that the studs 30, 31 are formed in such a way that straight pipe-like carriers 20, 21 can be used. The advantage is that no expensive bending processes are necessary and that furthermore, in case of straight pipe-like carriers the stability of the connection meets all requirements. Especially FIG. 2 makes clear that a fastening eye 34 is formed onto the motor carrier member 32 made of a diecasting member, which fastening eye 34 can generally be regarded as a fastening element and enables this motor carrier member 32 to be fixed onto the car body of the motor vehicle not illustrated. The studs 14, 15 on the wiper bearing and the studs 30, 31 on the motor carrier member are constructed to a large extent in same way.

FIGS. 3 and 4 show that the studs 14, 15 and 30, 31 comprise recesses 42 into which the pipe sections 41 of the pipe-like carriers 20, 21 are pressed. This deformation is preferably made by crimping by means of a special device. This connection thus represents a metal connection which is produced by the pressure extending the liquid limit of the materials involved without causing breaches or gaps.

Furthermore the FIGS. 1 to 4 show that the connecting sections V1, V2 between the carriers 20, 21 and the respective studs 14, 15 or 30, 31 are provided with a medium impermeable coating 6, 8 each. The coating 6, 8 are formed of a plastic skin and can form- and force-fittingly be connected with the connecting sections V1, V2. In the previous embodiment the coatings 6, 8 consist of a heat shrinkable plastic tube each which is shrunk onto the connecting sections V1 or V2. Thereby this tube is a heat shrinkable plastic tube 6, 8 resistant to tearing and made of polymeric material of a thickness of less than 3 mm.

Figure 5:
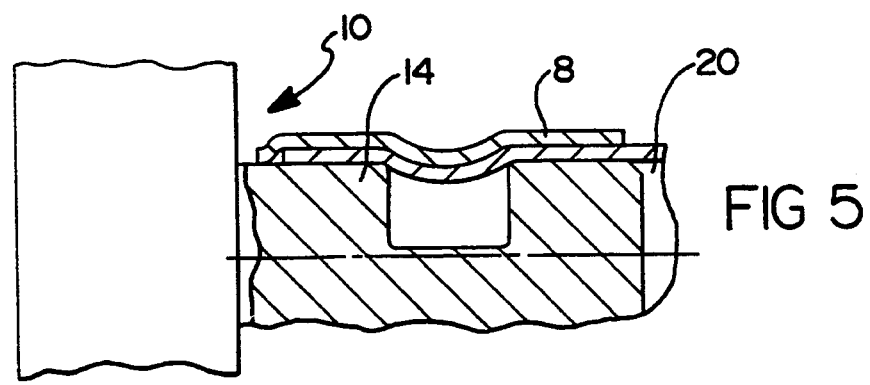
FIG. 5 is an embodiment with a heat shrinkable plastic tube extending the end of the carrier.
Figure 6:
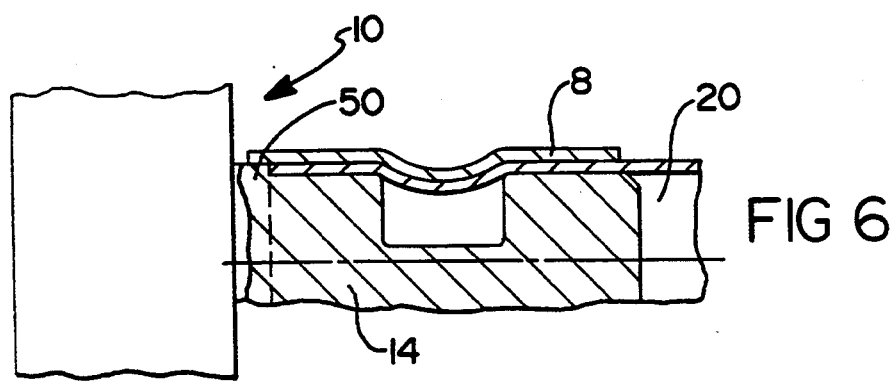
FIG. 6 is an embodiment similar to that according to FIG. 5 with a collar on the stud of the carrier.

In the embodiments according to the FIGS. 5 and 6 the heat shrinkable plastic tube 8 extends the end of the carrier 20. Therefore it seals the interior of the carrier 20 from the end of said carrier onwards so that the connection between the carrier 20 and the wiper bearing 10 is protected against corrosion also inside. The stud 14 of the wiper bearing according to FIG. 5 is of the same diameter within the carrier 20 and in front of the carrier. Therefore in front of the carrier the heat shrinkable plastic tube 8 is shrunk up to the diameter of the stud 14, which diameter is smaller in comparison to the outer diameter of the carrier 20. The stud 14 of the wiper bearing 10 according to FIG. 6 comprises a collar 50 in front of the carrier 20, the diameter of which collar 50 corresponds to the outer diameter of the carrier 20 and which collar 50 is surrounded by the heat shrinkable plastic tube 8. Thus this heat shrinkable plastic tube has to shrink in front of the carrier 20 only to the same extent as in the area of the carrier.

When producing a firm and sealed connection between the heat shrinkable plastic tube 6, 8 and the connecting section V1, V2 it can be proceeded as follows: The carrier 20 is provided with at least one pre-formed heat shrinkable plastic tube and is operatively connected with the studs, what can be done for instance by crimping. Then the heat shrinkable plastic tube is pushed over the connecting section V1 or V2 and is heated up to a temperature in which the shrinking process of the tube is released. By heating the heat shrinkable plastic tube up to a certain temperature, the forces, upon deformation of the heat shrinkable plastic tube, are released, which forces make the heat shrinkable plastic tube occupy its original form. For one carrier a sole heat shrinkable plastic tube extending from the one end up to the other end of the carrier can be used. However, it seems to be more of an advantage, if a separate heat shrinkable plastic tube each is used for each connecting area V1, V2; for short pieces of heat shrinkable plastic tubes can easily be shifted on the carrier so far that the carrier can be deformed in the connecting areas without damaging the pieces of the heat shrinkable plastic tubes.

On the whole, thus a wiper system is created, which wiper system meets all the requirements of protection against corrosion, which, however, at low costs, can be manufactured from fewer separate members.

What is claimed is:

1. A wiper system for motor vehicles comprising:
    structural member means for supporting a windshield wiper, said structural member means being fixed to one end of a pipe-like carrier, wherein a joint formed between the structural member and carrier includes impermeable coating means for limiting corrosion caused by moisture,
    wherein said coating comprises a heat shrinkable plastic tube having a wall thickness of less than 3 millimeters.

2. A wiper system according to claim 1, wherein said pipe-like carrier is connected to a stud carried by said structural member, and wherein said coating is formed of a plastic skin which is firmly connected to the joint.

3. A wiper system according to claim 2, wherein the coating extends axially at least to the end of the carrier.

4. A wiper system according to claim 3, wherein the stud comprises a collar axially adjacent the carrier, the collar having a diameter which approximately corresponds to an outer diameter of the carrier and on which collar the coating partially lies.

5. A wiper system according to claim 2, wherein the stud comprises at least one recess, and wherein the carrier is connectable to the stud in the area of the recess by crimping.

6. A wiper system according to claim 2, wherein the stud comprises at least two recesses.

7. A wiper system according to claim 2, wherein the stud is connectable to the carrier by a plug-in connection.

8. A wiper system according to claim 2, wherein the carrier as well as the stud is of an approximately round cross-section, whereby an inner diameter of the carrier is slightly bigger than an outer diameter of the stud.

9. A wiper system according to claim 1, wherein the heat shrinkable plastic tube is shorter than the carrier.

10. A wiper system according to claim 9, wherein said carrier forms a second joint at an opposite end thereof with a second structural member and wherein said second Joint includes a second heat shrinkable plastic tube, wherein the combined axial length of the two heat shrinkable plastic tubes is shorter than the axial length of the carrier.

11. A wiper system according to claim 1, wherein the heat shrinkable plastic tube comprises polymeric material, said polymeric material being resistant to tearing.

* * * * *